Aug. 22, 1972 KENJIRO KASHII 3,686,088
METHOD FOR IONOPHORESIS OF A DILUTE ELECTROLYTE SOLUTION
Filed Nov 20, 1970

INVENTOR.
Kenjiro Kashii

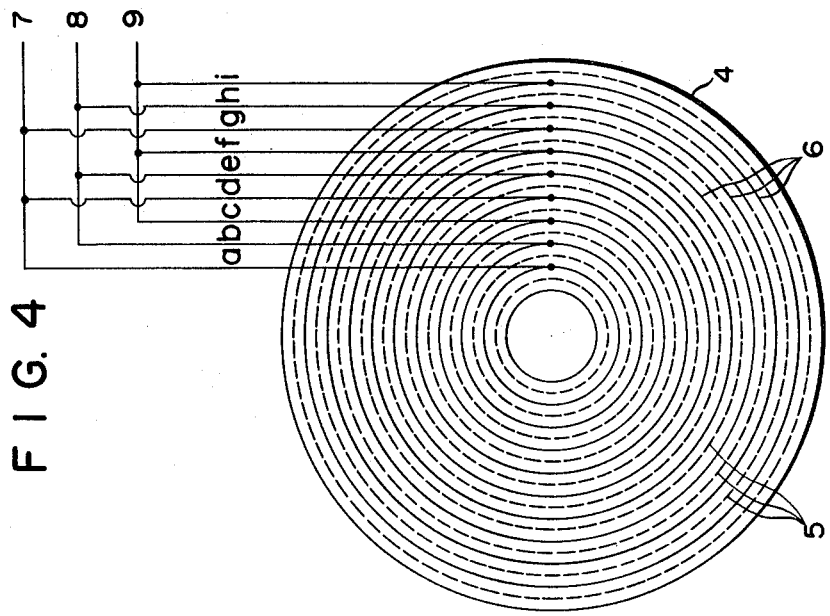
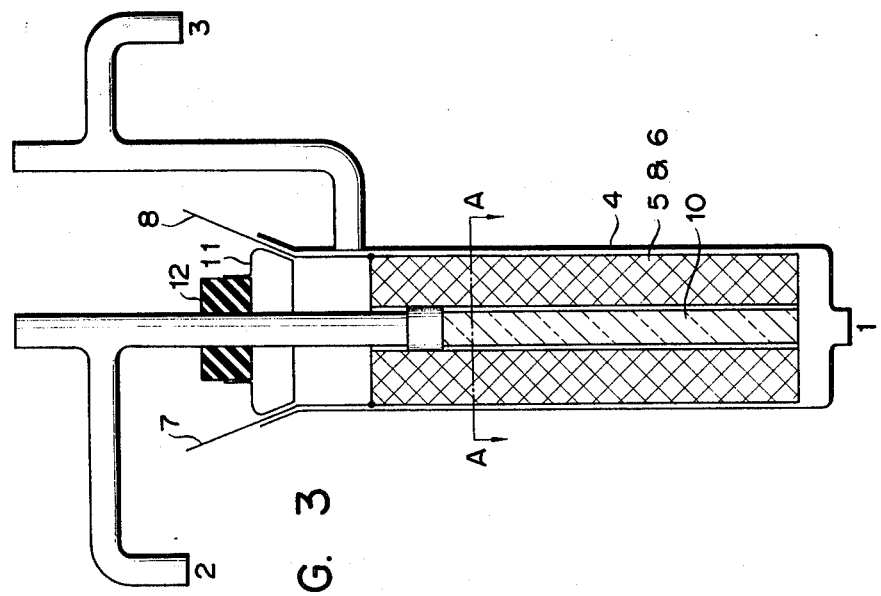

3,686,088
METHOD FOR IONOPHORESIS OF A DILUTE ELECTROLYTE SOLUTION

Kenjiro Kashii, 5–14–5 Saginomiya,
Nakano-ku, Tokyo, Japan
Filed Nov. 20, 1970, Ser. No. 91,327
Claims priority, application Japan, Nov. 20, 1969,
44/92,524
Int. Cl. B01k 5/00
U.S. Cl. 204—180 R                3 Claims

ABSTRACT OF THE DISCLOSURE

There has been discovered a novel method for ionophoresis, that is, ionic cataphoresis of a dilute electrolyte solution characterized by using a specific multiphase alternating current instead of usually applied direct current. A dilute electrolyte solution, which does not evolve any appreciable amount of gas upon electrolysis, can be treated by this method, and purification of water or concentration of electrolyte in water may be carried out continuously and easily by this treatment.

---

Separation of an electrolyte solution by concentration at one pole and dilution at the other of a D.C. field has practically been carried out by ionophoresis using a semipermeable membrane, ion exchange resin or ion-exchange membrane. With this process, however, preparation of an expensive resin or membrane requires advanced skill and technique, and its replacement necessitates a temporary stop of operation. Moreover, regeneration of a spent resin or membrane for reactivation consumes considerable trouble.

The object of the present invention is to provide an industrial method of and apparatus for ionophoresis which permits continuous operation by a simple process without using any expensive resin or membrane difficult to handle which has been required for the prior art.

This object may be attained by the present invention using a specific multiphase alternating current instead of usually applied direct current. Namely, there has been discovered a method of ionophoresis to treat an electrolyte solution which is characterized by electrolyzing a dilute electrolyte solution having an electric conductivity of 1 to 2000 micromho per centimeter using an alternating current, whose number of phase, electrolytic voltage and frequency are 2 to 6, 0.2 to 10 volts and 0.4 to 60 cycles per minute respectively, wherein said electrolytic voltage is impressed on plural sets of porous plate electrodes for multiphase alternating current connected in parallel.

Further objects and advantages of the invention will become apparent with reference to the following description and the accompanying drawings, in which:

FIG. 3 is a schematically sectioned elevational view of FIG. 2; and

FIG. 4 is an enlarged sectional plan view of another modified electrolytic cell according to another embodiment of the invention.

I have found a method of and apparatus for ionophoresis, that is, ionic cataphoresis of a dilute electrolyte solution, characterized in that there is applied a specific multiphase alternating current.

The principle of the method is as follows. When a specific multiphase alternating current is supplied to plural sets of porous plate electrodes connected in parallel, the positive and negative ions of an electrolyte solution collectively move in the same direction with the cyclical change of the electrode polarity. Therefore, across the electrolytic cell, there occurs a gradient concentration of electrolyte, obtaining concentrated electrolyte from one outlet of the cell and substantially purified water from the other.

The specific multiphase alternating current used in the present invention should have 2 to 6 phases, 0.4 to 20 electrolytic volts and 0.1 to 60 cycles per minute. Experiments show that if the alternating current does not meet these conditions, ionophoresis can not be effectively or efficiently carried out. While there is no particular limitation on the wave form of alternating current, a rectangular wave provides the highest efficiency.

There will now be described apparatuses to practise the method of the present invention.

Figure 1:
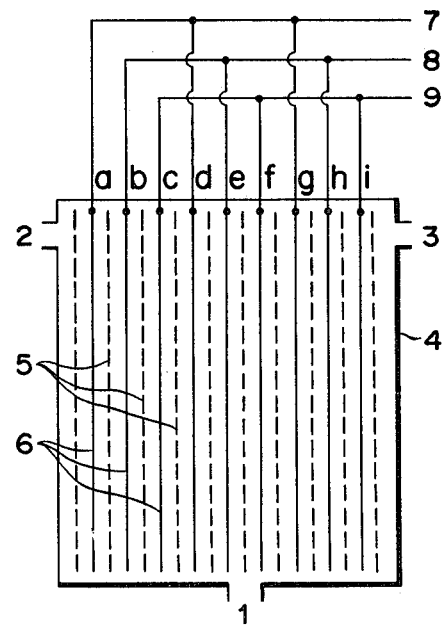
FIG. 1 shows a schematic arrangement of an electrolytic cell according to an embodiment of the present invention.

The electrolytic cell of FIG. 1 comprises three sets $a$–$b$–$c$, $d$–$e$–$f$ and $g$–$h$–$i$ of rectangular porous plate electrodes 6 for 3-phase A.C. connected in parallel, which are linearly superposed on each other in a sealed container 4, with an insulating screen 5 inserted therebetween. A dilute electrolyte solution is introduced at an inlet 1, while a concentrated electrolyte liquor is taken out at an outlet 2 or 3, and de-mineralized or purified water at the opposite outlet 3 or 2. The plate electrodes 6 are connected in parallel to 3-phase power sources 7, 8 and 9. That is, the set $a$–$d$–$g$ of the electrodes is connected to the source 7, the set $b$–$e$–$h$ to the source 8 and the set $c$–$f$–$i$ to the source 9.

When the 3-phase power sources 7, 8 and 9 are connected to the electrodes with the polarities of said sources so selected as to cause the peak voltage of each phase cyclically to arise in the order of 7, 8 and 9, then the distribution of positive and negative polarities of the electrodes varies according to the proceeding change of electric angles as shown in Table 1 below.

TABLE 1
Distribution of positive and negative polarities in the electrodes

| Electric angle (degree) | a | b | c | d | e | f | g | h | i |
|---|---|---|---|---|---|---|---|---|---|
| 0   | + | − | + | + | − | + | + | − | + |
| 60  | + | − | − | + | + | − | + | + | − |
| 120 | + | + | − | − | + | + | − | + | + |
| 180 | − | + | + | − | − | + | + | − | + |
| 240 | − | + | + | − | + | + | − | + | + |
| 300 | − | − | + | + | − | + | + | − | + |
| 360 | + | − | + | + | − | + | + | − | + |

As seen from Table 1, increase with time in the electric angle causes the arrangement of positive and negative voltages of the electrodes varies, as though the negative voltage of electrodes lying between positive electrodes, as well as the positive voltage of electrodes lying between negative electrodes, gradually shifts to the right.

If, in case there is electrolyzed a dilute electrolyte solution using this cell, the frequency of alternating current is so selected as to cause ions substantially to complete transit across the electrodes at an electric angle of 60° depending on their moving velocity with respect to the field intensity, then the negative and positive ions of the electrolyte will have a greater chance to travel on and onto the right. Thus the electrolyte will present such a gradient concentration in which it is prominently concentrated on the right side, whereas said concentration is very much reduced on the left side. If, therefore, the electrolytic cell is properly designed, a dilute electrolyte solution slowly and continuously introduced into the cell at the inlet 1 is subjected to an ionophoresis action and taken out in a concentrated form at the outlet 3, and substantially purified water comes out at the outlet 2.

The concentration of a raw electrolyte solution to be electrolyzed by the method of the present invention is subject to a certain limitation. If an electrolyte solution is of such type as would evolve large amounts of gas such as oxygen, hydrogen or chlorine upon electrolysis, it would be be difficult to provide the apparatus with means for removing such gas, thus inviting the danger of mixed oxygen and hydrogen making explosions. So long as the generated amounts of such gas are minute, there will be little practical obstruction. Experiments show that a raw electrolyte solution substantially free from the evolution of gas upon electrolysis should have an electric conductivity of 1 to 2000 micromho per centimeter.

Figure 2:
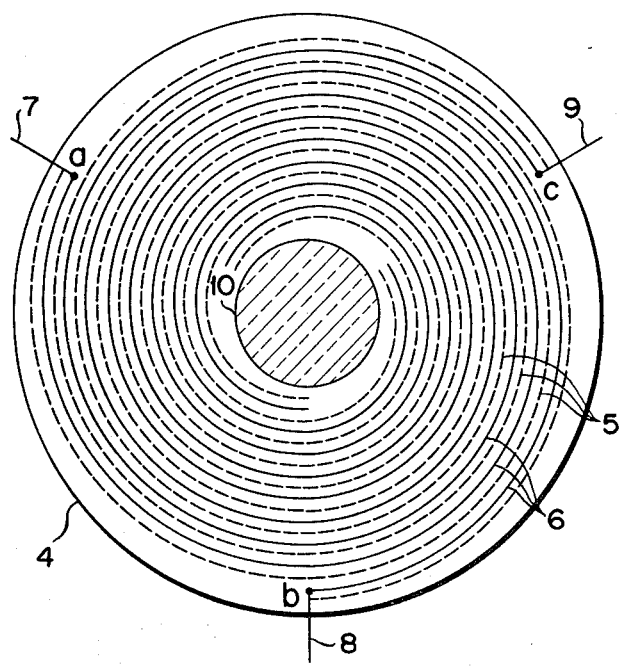
FIG. 2 is an enlarged sectional plan view of a modified electrolytic cell on line A—A in FIG. 3.

FIGS. 2 and 3 jointly represent a modification of the electrolytic cell of the present invention. About a core pillar 10 are spirally wound three long porous sheet electrodes 6 with three long insulating screens sandwiched therebetween. This electrode-screen assembly is received in a container 4 provided with an inlet 1 for a raw electrolyte solution and two outlets 2 and 3 for the electrolyzed liquids. Three conductors 7, 8 and 9 from three A.C. power sources (not shown) are connected to three electrodes a, b and c respectively. The container 4 is hermetically sealed with a cap 11 and rubber plug 12. In FIG. 3 there is only schematically indicated the electro-screen assembly of FIG. 2.

A raw electrolyte solution continuously introduced at the inlet 1 is subjected to the aforesaid specific ionophoresis action in a 3-phase A.C. field while passing between the electrodes 6. Substantially purified water collected at the cell center is drawn out at the outlet 2, and a concentrated electrolyzed liquor gathered at the cell side is discharged at the outlet 3. If electric wiring is so devised as to reverse the polarities of the power sources, then the concentrated electrolyzed liquor will come out at the outlet 2 and the substantially purified water at the outlet 3.

FIG. 4 illustrates another modification of the electrolytic cell. To three power sources 7, 8 and 9 are connected in parallel, as in FIG. 1, three concentrically arranged sets of porous cylindrical electrodes 6 for 3-phase A.C., with insulating porous cylinders 5 inserted therebetween. The connections of electrodes a, b, c, d, e, f, g, h and i to the electric sources 7, 8 and 9 are all the same with those in FIG. 1.

The method and apparatus of the present invention permits continuous ionophoresis over a long period by a simple operation without using any of the conventional expensive ion-exchange resin or membrane which is difficult to handle. It will be apparent that the technique of the present invention has broad industrial applications such as production of pure water from sea water, concentration of sea water, removal of particular minute substances contained in a solution, purification of waste liquid from plants and recovery of useful materials therefrom.

EXAMPLES

The method of the present invention will be more fully understood with reference to the following examples.

Example 1

Experiment was made with the purification of underground water using an electrolytic cell of the type shown in FIG. 1. The electrodes used consisted of 90 corrosion-resistant wire gauge nets assuming a rectangular form of 2 cm. x 15 cm. Between the electrodes were inserted thin sheets of felt of the same shape as insulating material. There was continuously introduced into the cell underground water having an electric conductivity of 250 micromho per centimeter at 20° C. at the flow rate of 2 cc. per minute, using a 3-phase A.C. source of 6 volts and 6 cycles per minute having a rectangular wave form. As a result, there were continuously obtained 1 cc. per minute of purified water having an electric conductivity of 12 micromho per centimeter at 20° C., and 1 cc. per minute of concentrated liquor having an electric conductivity of 330 micromho per centimeter at the same temperature. The electric current fluctuated between 2.5 and 3.4 ampere.

A 3-phase electric source having a rectangular wave form used for the apparatus of the present invention can be provided by rotating a rotor having two semi-cylindrical conductors mounted on a cylinder in insulating relationship, connecting the rotor through a slip ring to the positive and negative terminals of a D.C. source and collecting current by means of a brush at three points spaced from each other by 120 degrees of a peripheral angle.

Example 2

There was used an electrolytic cell of the same construction and size as in Example 1. There was continuously introduced into the cell 1.5 cc. per minute of distilled water having an electric conductivity of 2.1 micromho per centimeter at 20° C., using a 3-phase A.C. source of 8 volts and 8 cycles per minute having a rectangular waveform. As a result, there were continuously obtained 0.5 cc. per minute of extremely purified water having an electric conductivity of 0.8 micromho per centimeter at 20° C. and 1.0 cc. per minutte of drainage having an electric conductivity of 2.9 micromho per centimeter at the same temperature. The electric current fluctuated between 0.12 and 0.20 ampere.

Example 3

There was conducted the ionophoresis of dilute saline water using the same type of cell as illustrated in FIGS. 2 and 3. There were used laminated strips consisting of three 10 cm. x 300 cm. rectangular wire gauge nets, with Japanese paper of same size inserted therebetween. Said laminated assembly was spirally wound about an 8 mm. diameter glass pillar with the 10 cm. side positioned parallel with the axis of the glass pillar. All these were placed in a cylindrical glass container 17 mm. in inner diameter. There was continuously drawn into the cell 0.6 cc. per minute of 50-fold diluted sea water having an electric conductivity of 750 micromho per centimeter at 20° C., using a 3-phase A.C. source of 7 volts and 0.36 cycle per minute having a rectangular wave form. There were continuously obtained 0.15 cc. per minute of substantially purified water having an electric conductivity of 240 micromho per centimeter at 20° C. and 0.45 cc. per minute of drainage having an electric conductivity of 900 micromho per centimeter at the same temperature. The electric current fluctuated between 0.5 and 0.7 ampere.

Example 4

There was used an electrolytice cell of the same construction and size as in Example 3. There was continuously brought into the cell 0.6 cc. per minute of city water having an electric conductivity of 68 micromho per centimeter at 20° C., using a 3-phase A.C. source of 4 volts and 2.5 cycles per minute having a rectangular waveform. There were continuously obtained 0.45 cc. per minute of concentrated water having an electric conductivity of 204 micromho per centimeter at 20° C. and 0.15 cc. per minute of purified water having an electric conductivity of 24 micromho per centimeter at the same temperature. The electric current fluctuated between 0.15 and 0.3 ampere.

What is claimed is:

1. A method of ionophoresis of a dilute electrolyte solution which comprises passing electric current through said solution between a plurality of electrodes each connected to one phase of a plural-phase alternating current supply, said solution having an electrical conductivity in the range of 1 to 2000 micromho per centimeter, the number of phases of said supply being in the range of two to six, the voltage applied between said electrodes being in the range of 0.4 to 20 volts and the frequency of said supply being in the range of 0.1 to 60 cycles per minute.

2. A method of ionophoresis in accordance with claim 1 wherein said alternating current has a rectangular waveform.

3. A method of ionophoresis in accordance with claim 1 wherein a plurality of electrodes are connected to each said phase of said supply.

References Cited

UNITED STATES PATENTS

| | | | |
|---|---|---|---|
| 3,029,196 | 4/1962 | Matz et al. | 204—180 P |
| 3,207,684 | 9/1965 | Dotts, Jr. | 204—180 R |
| 3,479,277 | 11/1969 | Kolin et al. | 204—299 |
| 3,539,494 | 11/1970 | Pretorius et al. | 204—299 |

GERALD L. KAPLAN, Primary Examiner

A. C. PRESCOTT, Assistant Examiner